(12) United States Patent
Wright et al.

(10) Patent No.: US 9,121,706 B2
(45) Date of Patent: Sep. 1, 2015

(54) COMPASS CALIBRATION SYSTEM AND METHOD

(75) Inventors: Tom Wright, Holland, MI (US); Philip J. Vanderwall, Marne, MI (US)

(73) Assignee: Johnson Controls Technology Company, Holland, MI (US)

( * ) Notice: Subject to any disclaimer, the term of this patent is extended or adjusted under 35 U.S.C. 154(b) by 1296 days.

(21) Appl. No.: 12/968,233

(22) Filed: Dec. 14, 2010

(65) Prior Publication Data

US 2011/0087451 A1    Apr. 14, 2011

Related U.S. Application Data

(63) Continuation of application No. 12/034,501, filed on Feb. 20, 2008, now abandoned.

(60) Provisional application No. 60/902,409, filed on Feb. 21, 2007.

(51) Int. Cl.
  *G01C 17/38*    (2006.01)

(52) U.S. Cl.
  CPC .................................... *G01C 17/38* (2013.01)

(58) Field of Classification Search
  CPC ........ G01C 17/02; G01C 17/10; G01C 17/28; G01C 17/30; G01C 17/38
  USPC ............ 702/31, 38, 85, 90, 92, 94, 150, 151, 702/154, 155, 182; 701/224; 33/356
  See application file for complete search history.

(56) References Cited

U.S. PATENT DOCUMENTS

| | | | |
|---|---|---|---|
| 4,024,382 A | 5/1977 | Fowler | |
| 4,743,913 A | 5/1988 | Takai | |
| 4,881,080 A | 11/1989 | Jablonski | |
| 4,954,833 A | 9/1990 | Evans et al. | |
| 5,146,231 A | 9/1992 | Ghaem et al. | |
| 5,216,816 A | 6/1993 | Ida | |
| 5,339,246 A * | 8/1994 | Kao | 701/469 |
| 5,345,382 A | 9/1994 | Kao | |
| 5,349,530 A | 9/1994 | Odagawa | |
| 5,485,385 A | 1/1996 | Mitsugi | |
| 5,572,217 A | 11/1996 | Flawn | |
| 5,761,094 A * | 6/1998 | Olson et al. | 702/92 |
| 6,014,610 A | 1/2000 | Judge et al. | |
| 6,166,698 A | 12/2000 | Turnbull et al. | |

(Continued)

OTHER PUBLICATIONS

Bowdith, American Practical Navigator, Published by the uS Navy Hyrographic Office, 1914. pp. 174, 189-192.*

(Continued)

*Primary Examiner* — Mohamed Charioui
(74) *Attorney, Agent, or Firm* — Foley & Lardner LLP

(57) ABSTRACT

A compass system includes a processing circuit configured to use the deviations for each of the plurality of headings to calculate a plurality of compass deviation coefficients representative of different types of noise sources. At least one compass deviation coefficient is determined based on a database of geographic zone error factors stored in the memory device and based on a position of the compass. The processing circuit is configured to update the database of geographic zone error factors using an internet connection. The processing circuit is configured to store the deviation coefficients in memory and to at least one of calibrate the compass and adjust an output from the compass using the compass deviation coefficients.

20 Claims, 12 Drawing Sheets

(56) References Cited

U.S. PATENT DOCUMENTS

| | | | |
|---|---|---|---|
| 6,320,496 B1* | 11/2001 | Sokoler et al. | 340/407.1 |
| 6,349,263 B1 | 2/2002 | Green et al. | |
| 6,353,798 B1 | 3/2002 | Green et al. | |
| 6,401,037 B1 | 6/2002 | Muller et al. | |
| 6,407,712 B1 | 6/2002 | Turnbull et al. | |
| 6,408,251 B1 | 6/2002 | Azuma | |
| 6,430,505 B1 | 8/2002 | Green | |
| 6,539,306 B2 | 3/2003 | Turnbull | |
| 6,750,823 B2 | 6/2004 | Turnbull et al. | |
| 6,850,844 B1 | 2/2005 | Walters et al. | |
| 6,857,194 B2 | 2/2005 | Parks et al. | |
| 6,928,366 B2 | 8/2005 | Ockerse et al. | |
| 6,946,978 B2 | 9/2005 | Schofield | |
| 6,964,108 B2 | 11/2005 | Parks et al. | |
| 6,968,273 B2 | 11/2005 | Ockerse et al. | |
| 7,004,593 B2 | 2/2006 | Weller et al. | |
| 7,331,115 B2 | 2/2008 | Schierbeek et al. | |
| 7,451,549 B1 | 11/2008 | Sodhi et al. | |
| 2002/0032510 A1 | 3/2002 | Turnbull et al. | |
| 2003/0018430 A1 | 1/2003 | Ladetto et al. | |
| 2004/0002994 A1* | 1/2004 | Brill et al. | 707/104.1 |
| 2004/0254727 A1 | 12/2004 | Ockerse et al. | |
| 2005/0138825 A1* | 6/2005 | Manfred | 33/356 |
| 2005/0155240 A1* | 7/2005 | Kwon et al. | 33/356 |

OTHER PUBLICATIONS

American Practical Navigator: Bowditch, published by the US Navy Hydrographic Office. 1914. pp. 174, 189-192.

Microprocessor controlled compass module, printed at Internet address: http://www.manufacturingtalk.com/news/ilx/ilx162.html, 1 page, believed to be available Jan. 11, 2007.

Non-Final Office Action mailed Mar. 30, 2010 in U.S. Appl. No. 12/034,501, 12 pages.

Rukstales et al., Declination Chart, The International Geomagnetic Reference Field, 2000, 1 page.

* cited by examiner

FIG. 9

| Compass heading | Deviation | Compass Heading | Deviation |
|---|---|---|---|
| 000° | 1°.5W | 180° | 8°.0E |
| 045° | 34°.0E | 225° | 1°.5W |
| 090° | 31°.0E | 270° | 29°.0W |
| 135° | 13°.5E | 315° | 36°.0W |

FIG. 10

| CH | A | B | C | D | E | d |
|---|---|---|---|---|---|---|
| 000 | +2.3 | 0.0 | −4.8 | 0.0 | +1.1 | −1.4 |
| 015 | +2.3 | +7.8 | −4.6 | +6.9 | +1.0 | +13.4 |
| 030 | +2.3 | +15.0 | −4.2 | +12.0 | +0.6 | +25.7 |
| 045 | +2.3 | +21.2 | −3.4 | +13.8 | 0.0 | +33.9 |
| 060 | +2.3 | +26.0 | −2.4 | +12.0 | −0.6 | +37.3 |
| 075 | +2.3 | +29.0 | −1.2 | +6.9 | −1.0 | +36.0 |
| 090 | +2.3 | +30.0 | 0.0 | 0.0 | −1.1 | +31.2 |
| 105 | +2.3 | +29.0 | +1.2 | −6.9 | −1.0 | +24.6 |
| 120 | +2.3 | +26.0 | +2.4 | −12.0 | −0.6 | +18.1 |
| 135 | +2.3 | +21.2 | +3.4 | −13.8 | 0.0 | +13.1 |
| 150 | +2.3 | +15.0 | +4.2 | −12.0 | +0.6 | +10.1 |
| 165 | +2.3 | +7.8 | +4.6 | −6.9 | +1.0 | +8.8 |
| 180 | +2.3 | 0.0 | +4.8 | 0.0 | +1.1 | +8.2 |
| 195 | +2.3 | −7.8 | +4.6 | +6.9 | +1.0 | +7.0 |
| 210 | +2.3 | −15.0 | +4.2 | +12.0 | +0.6 | +4.1 |
| 225 | +2.3 | −21.2 | +3.4 | +13.8 | 0.0 | −1.7 |
| 240 | +2.3 | −26.0 | +2.4 | +12.0 | −0.6 | −9.9 |
| 255 | +2.3 | −29.0 | +1.2 | +6.9 | −1.0 | −19.6 |
| 270 | +2.3 | −30.0 | 0.0 | 0.0 | −1.1 | −28.8 |
| 285 | +2.3 | −29.0 | −1.2 | −6.9 | −1.0 | −35.8 |
| 300 | +2.3 | −26.0 | −2.4 | −12.0 | −0.6 | −38.7 |
| 315 | +2.3 | −21.2 | −3.4 | −13.8 | 0.0 | −36.1 |
| 330 | +2.3 | −15.0 | −4.2 | −12.0 | +0.6 | −28.3 |
| 345 | +2.3 | −7.8 | −4.6 | −6.9 | +1.0 | −16.0 |

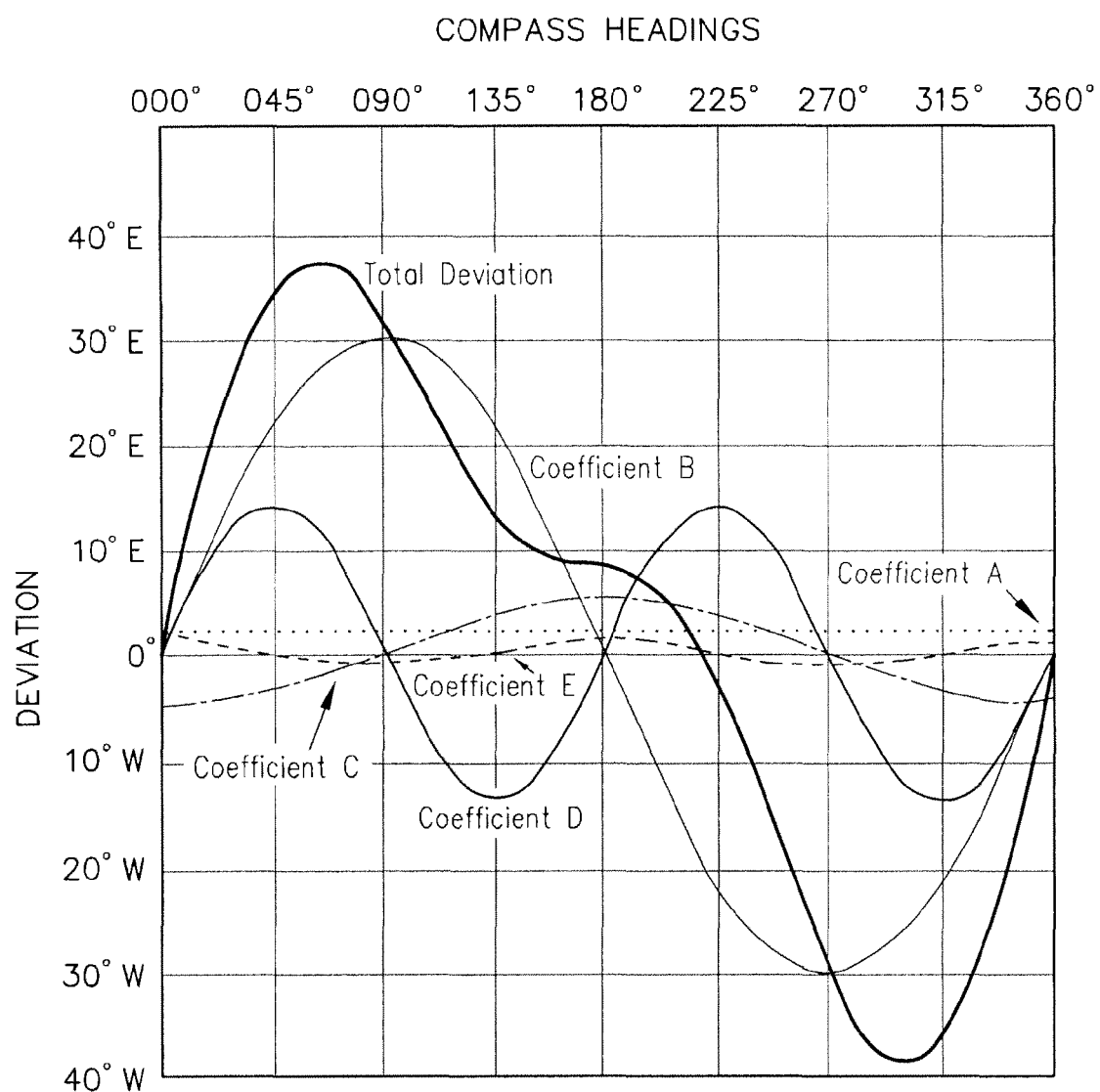

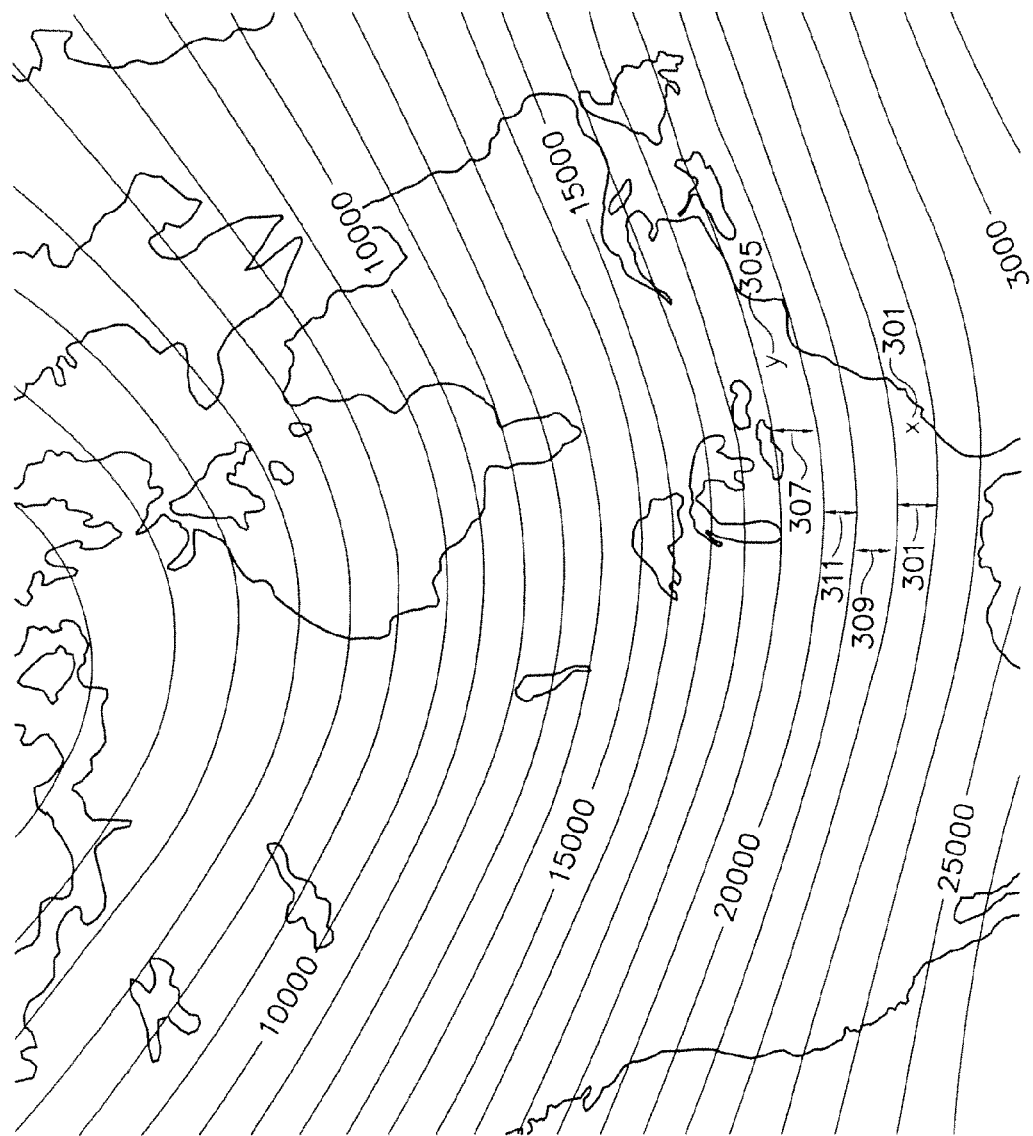

COMPASS CALIBRATION SYSTEM AND METHOD

CROSS-REFERENCE TO RELATED PATENT APPLICATIONS

This application is a Continuation of U.S. application Ser. No. 12/034,501, filed Feb. 20, 2008, incorporated herein by reference in its entirety, which claims priority from U.S. Provisional Application No. 60/902,409, filed Feb. 21, 2007, incorporated herein by reference in its entirety.

BACKGROUND

The present disclosure relates to magnetic direction sensing system. The magnetic direction sensing system utilizes a positioning system to assist in compass calibration.

There exists a need for a compass compensation system capable of more efficiently and accurately compensating for and recovering from abrupt changes in vehicular magnetism regardless of the significance of the change and having the capability to more efficiently and more accurately compensate for the initial vehicular magnetism of a new vehicle.

Further, there is a need to determine the geographic zone the compass is located in and automatically and continually apply the correct compass error factor.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a system including a compass, a receiver configured to communicate with a positioning system, and a processor configured to communicate with the compass and the receiver. The system further includes a first input for receiving a first signal associated with the compass and a second input for receiving a second signal associated with the positioning system. The processor is configured to calculate a compass error factor based on a deviation analysis. The deviation analysis is based on the first signal and the second signal.

One embodiment relates to an in-vehicle compass system including a compass, a transceiver configured to communicate with a positioning system, and a processor configured to communicate with the compass and the transceiver. The in-vehicle compass system also includes a control circuit configured to communicate with the processor. The in-vehicle compass system further includes a memory device configured to store an in-vehicle compass system configuration, at least one magnetic field model compass error factor and configured to communicate with the control circuit. The in-vehicle compass system configuration includes a magnetic field model utilization parameters and a deviation analysis utilization parameters. The control circuit utilizes a magnetic field model compass error factor based on the magnetic field model utilization parameters being triggered and the control circuit utilizes a compass error factor from a deviation analysis based on the deviation analysis utilization parameters being triggered.

One embodiment relates to a method for calibrating an electronic compass system including calculating a location based on a positioning system location signal and calculating a deviation analysis based on the positioning system location signal and a compass signal. The method further includes calculating a compass error factor based on the deviation analysis and utilizing the compass error factor to adjust the electronic compass system.

One embodiment relates to a method for calibrating an electronic compass system including determining a longitude position and a latitude position and determining a magnetic field strength utilizing a magnetic field model based on the longitude position and the latitude position. The method further includes determining a vehicle heading based on a positioning signal and determining a magnetic heading correction factor based on the magnetic field strength and the vehicle heading.

BRIEF DESCRIPTION OF THE DRAWINGS

The application will become more fully understood from the following detailed description, taken in conjunction with the accompanying drawings.

FIG. 9 is a table illustrating deviation of cardinal and inter-cardinal compass headings for a magnetic compass which has not been adjusted;

FIG. 10 is a table illustrating the deviation due to each component, and the total, on various headings of the compass in the example given above;

FIG. 11 is a graphical model of deviation analysis coefficients and total deviation of an unadjusted magnetic compass, according to an exemplary embodiment;

FIG. 12B is a graphical model of a magnetic field model of North America, according to an exemplary embodiment;

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
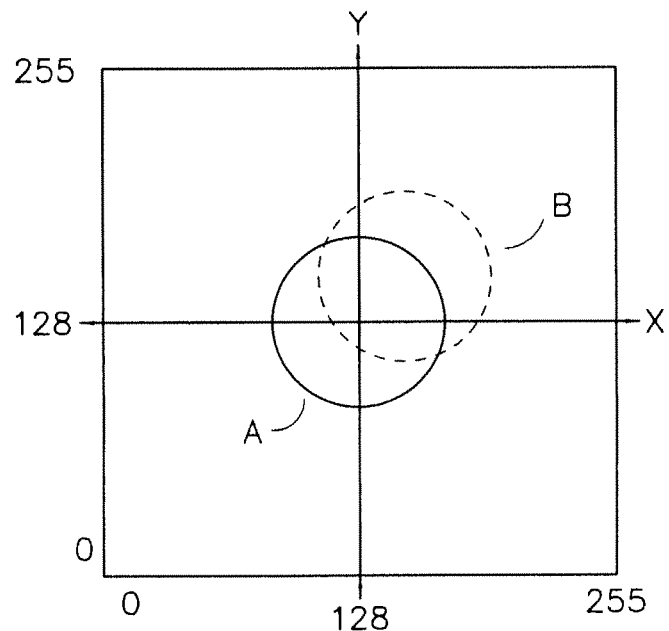
FIG. 1 is a graph illustrating the ideal signal representing the sensed magnetic field of the earth when the vehicle travels in a 360° loop, and the signal after a change in vehicular magnetism.

FIG. 1 discloses a magnetic field sensor and microprocessor-controlled compass system for a vehicle. The system utilizes flux-gate magnetic sensors to sense the magnitude of the earth's magnetic field in two channels of measurement. The sensor data, if plotted on an X-Y Cartesian coordinate plane, would be as shown in FIG. 1. For a properly calibrated compass, the plot of sensor data creates a perfect circle centered around the origin of the coordinate plane when the vehicle travels in a 360° loop, as indicated by graph A of FIG. 1. The radius of the circle represents the detected Earth's magnetic field strength, and the vehicle's compass heading at a particular time during travel is represented by a point on the circle. By calculating the angle at which the point forms with the X-Y coordinate plane, the compass heading of the vehicle may be determined. Depending on the location of the vehicle, the detected magnitude of the earth's magnetic field can vary significantly.

The sensed magnetic field will also be affected if there is a change in vehicular magnetism. Changes in the magnetism of a vehicle can be caused by driving the vehicle near the electrical power feeders of train or subway systems, installing a magnetic cellular antennae on the vehicle's roof, parking under an AC powerline, or even driving through a car wash, which can flex the sheet metal in the vicinity of the compass sensor and change its magnetic characteristics. The magnetic field can also be changed by a moving vehicle accessory, such as, a door, window or sunroof. Further, the magnetic field can be changed by a window defroster or window grid. Such a change in vehicular magnetism will cause the magnetic field sensed by the compass channels when the vehicle is heading in a given direction to be either greater than or less than that expected for a vehicle with no magnetic interference. As a result, the plot of sensor data will be shifted away from the origin of the coordinate plane in some direction, resulting in a pattern such as the circle shown in circle B of FIG. 1 when the vehicle travels a 360° loop. The magnitude of the shift of sensor data from the origin is proportional to the magnitude of the change in vehicular magnetism.

The compass system may provide automatic and continuous calibration to account for changes in the vehicle's magnetism, and thus the system's reaction to the earth's magnetic field. The calibration system includes means for testing the data received from the compass sensor to determine the maximum and minimum signal levels during movement of the vehicle through a completed 360° path of travel however circuitous the path may be.

This data is averaged over several such paths of vehicular travel to provide continuously updated and averaged compensation correction information. The automatic and continuous calibration is capable of correcting the compass system when the plot of sensor data experiences small shifts away from the origin of the coordinate plane due to small drifts in vehicular magnetism. The origin of the coordinate plane in these circumstances is still contained within the circle plotted when the vehicle travels a 360° loop, and the crossings of the sensor data on the axes of the coordinate plane are used to calculate the spans of the signal levels along each axis which determine the center of the circular plot of sensor data. Compensation signals are then generated based on the difference between the center of the circle and the origin of the coordinate plane.

However, if the shift of sensor data is large enough such that the origin of the coordinate plane is not contained within the circular plot of sensor data created when the vehicle travels a 360° loop, then heading information cannot be calculated and the calibration system cannot provide correction unless the sensor data experiences a subsequent shift that causes the origin of the coordinate plane to again be contained. Because such a subsequent shift may never occur or, if it does, may occur only after an undesirably long period of time, the compass system of the above-mentioned patent provides means to reinitiate calibration.

Figure 2:
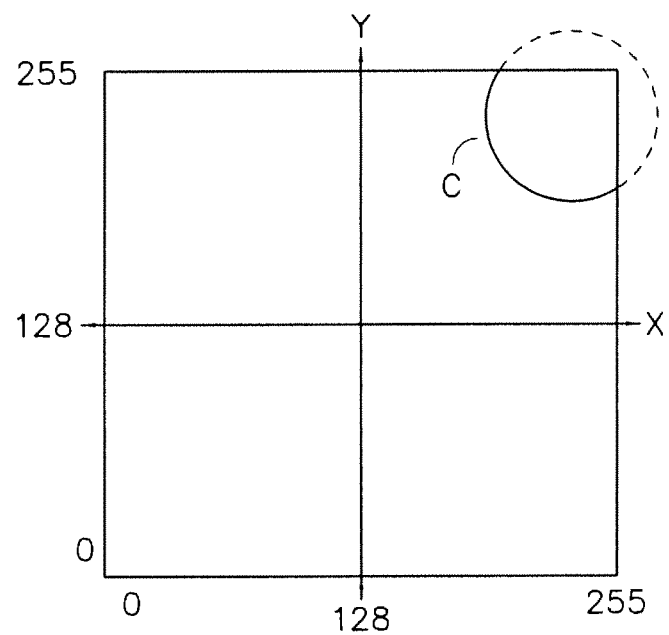
FIG. 2 is a graph illustrating the signal representing the sensed magnetic field of the earth after a large change in vehicular magnetism causing the saturation limits of a compass utilizing either flux-gate, magneto-resistive sensors or magneto-inductive sensors to be exceeded.

Reinitiation of calibration involves the collecting and centering of spans of sensor data followed by the collecting and centering of two circles of sensor data, which causes the origin of the coordinate plane to coincide with the center of the circular plot of sensor data. As such, the reinitiation process enables the compass system to recover from any change in vehicular magnetism and to provide accurate heading information. In order to detect situations where reinitiation of the calibration system is desirable to have the compass system maintain saturation limits at the outer boundaries of the range of measurement of the sensor data. For 8-bit sensor data, these saturation limits are at 0 and 255, as shown in FIG. 1. If a large change in vehicular magnetism causes the sensor data to shift and the current data is plotted outside of these limits for a continuous period of five minutes, then calibration is restarted. Such a shift is shown by graph C in FIG. 2, with the dashed portion thereof indicating the range of heading directions of the vehicle that would cause the sensor data to remain outside of the saturation limits.

Figure 3:
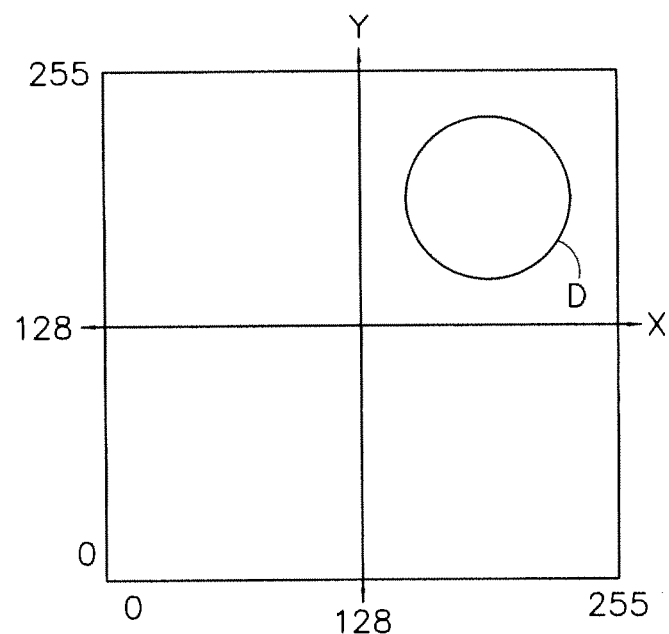
FIG. 3 is a graph illustrating the signal representing the sensed magnetic field of the earth after an intermediate change in vehicular magnetism.

However, intermediate changes in vehicular magnetism are possible which do not cause the sensor data to be plotted outside of the saturation limits. Such a shift is shown by graph D in FIG. 3. As such, it is known to also provide for a reinitiation of calibration if 15 ignition cycles of at least 5 minutes duration are completed without obtaining a crossing point on the axes of the X-Y coordinate plane. Furthermore, it is known to enable the operator of the vehicle to manually reinitiate calibration by operating a switch, button, or the like. Manual reinitiation would most likely occur when the operator notices that the displayed heading information is erroneous for an extended period of time. Although reinitiation of calibration enables the compass system to ultimately recover from changes in vehicular magnetism of any magnitude, such reinitiation is considered a rather extreme measure since it requires the clearing of all prior sensor readings and calibration data. Thus, until sufficient data is collected to calibrate the system, the system operates in an uncalibrated state.

This system has a lengthy averaging process and the system's method of gradual compensation makes it primarily suited for the compensation of slow and gradual changes in vehicular magnetism. As such, this compass system may be unable to adequately compensate for and recover from an abrupt and significant change in vehicular magnetism caused by, for example, driving the vehicle near the electrical power feeders of train or subway systems. Thus, such an event may cause a substantial impairment of compass operation resulting in erroneous heading information being displayed until recalibration or reinitialization of the system is achieved.

The Earth does not have a uniform magnetic field, which causes a magnetic field variance or declination. The variance or delineation requires different compass error factors depending upon the compass' location on the Earth. A magnetic field model may be used to correct for these different compass error factors. The magnetic field model is based off of magnetic field measurements received from numerous observation stations located on various parts of the Earth. These magnetic field points are used to create a magnetic field model. This magnetic field model may be used to determine the compass error factor for a particular geographic zone.

The compass system disclosed in U.S. Pat. No. 5,737,226 and hereby incorporated by reference, entitled VEHICLE COMPASS SYSTEM WITH AUTOMATIC CALIBRATION, issued on Apr. 7, 1998, utilizes a control program that calibrates the compass system utilizing only two averaged data points and one raw data point obtained from travel of the vehicle in less than a complete closed loop for purposes of calibrating the compass system during initialization following manufacture and at such times that the compass system determines that the obtained sensor data falls outside the saturation thresholds that previously required reinitialization of the compass system.

Figure 4:
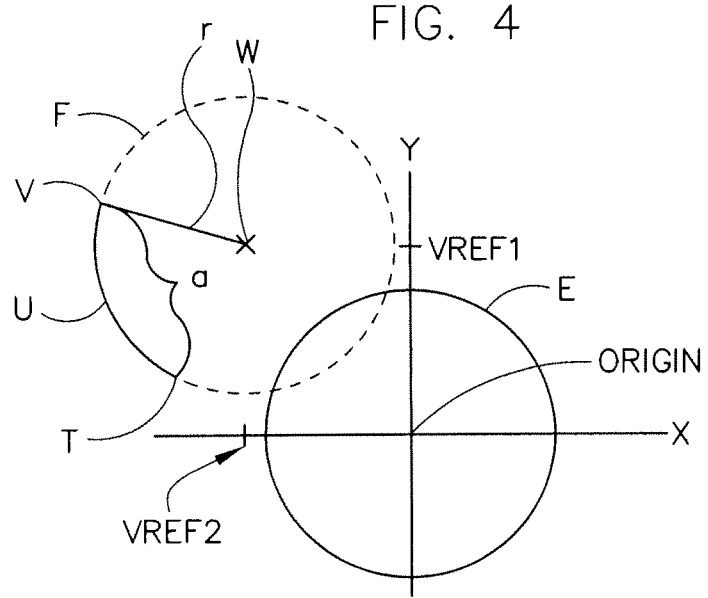
FIG. 4 is a graph illustrating the ideal signal from the magnetic field sensor and the signal after a change in vehicular magnetism whereby the center of the circle obtained after the change in magnetism is determined in accordance with the teachings of U.S. Pat. No. 5,737,226.

The manner by which the compass system disclosed in U.S. Pat. No. 5,737,226 recalibrates itself by identifying the center of a circular plot of data is described below with reference to FIG. 4. When a vehicle makes a slight turn, the data obtained from the sensors may take the form of the arc shown when plotted relative to Cartesian coordinates. The starting point T of the arc shown corresponds to the output of the sensors obtained just prior to the vehicle starting the turn. As the vehicle makes a turn, intermediate raw data points, such as point U, are read from the sensors. At the completion of the turn, the data point derived from the sensor output signals would correspond to ending point V. To perform a calculation of the center W of the arc (or center of circle F), it is desirable that starting point T and ending point V are data points in which there is a fair to high level of confidence in their accuracy. Such confidence in the data points may be present when the sensor outputs remain at a constant level for a predetermined period of time as would be the case when the vehicle is traveling straight. The center W of the plotted arc is calculated by assuming a predetermined value for the radius r and identifying the two points that are a distance r from both starting point T and ending point V. To discriminate between the two points thus obtained, an intermediate raw data point U is referenced, since the true center point will be that which is farthest away from intermediate point U.

Another method for improving calibration routine in a compass is disclosed in U.S. Pat. No. 7,127,823 and hereby incorporated by reference entitled VEHICLE COMPASS SYSTEM WITH CONTINUOUS AUTOMATIC CALIBRATION, issued Oct. 31, 2006. A processing circuit of the compass recalibrates the compass each time three data points are obtained from a magnetic field sensor that meet predetermined criteria. One such criterion is that the three data points define corners of a triangle that is substantially non-obtuse. When three data points have been obtained that define a triangle meeting this criterion, the processing circuit calculates a center point for a circle upon which all three data points lie by solving the equation $x^2+y^2+Ax+By+C=0$ for A, B, and C, using the coordinate values (x,y) for the three data points and defining the center point as $(-A/2, -B/2)$.

Figure 5:
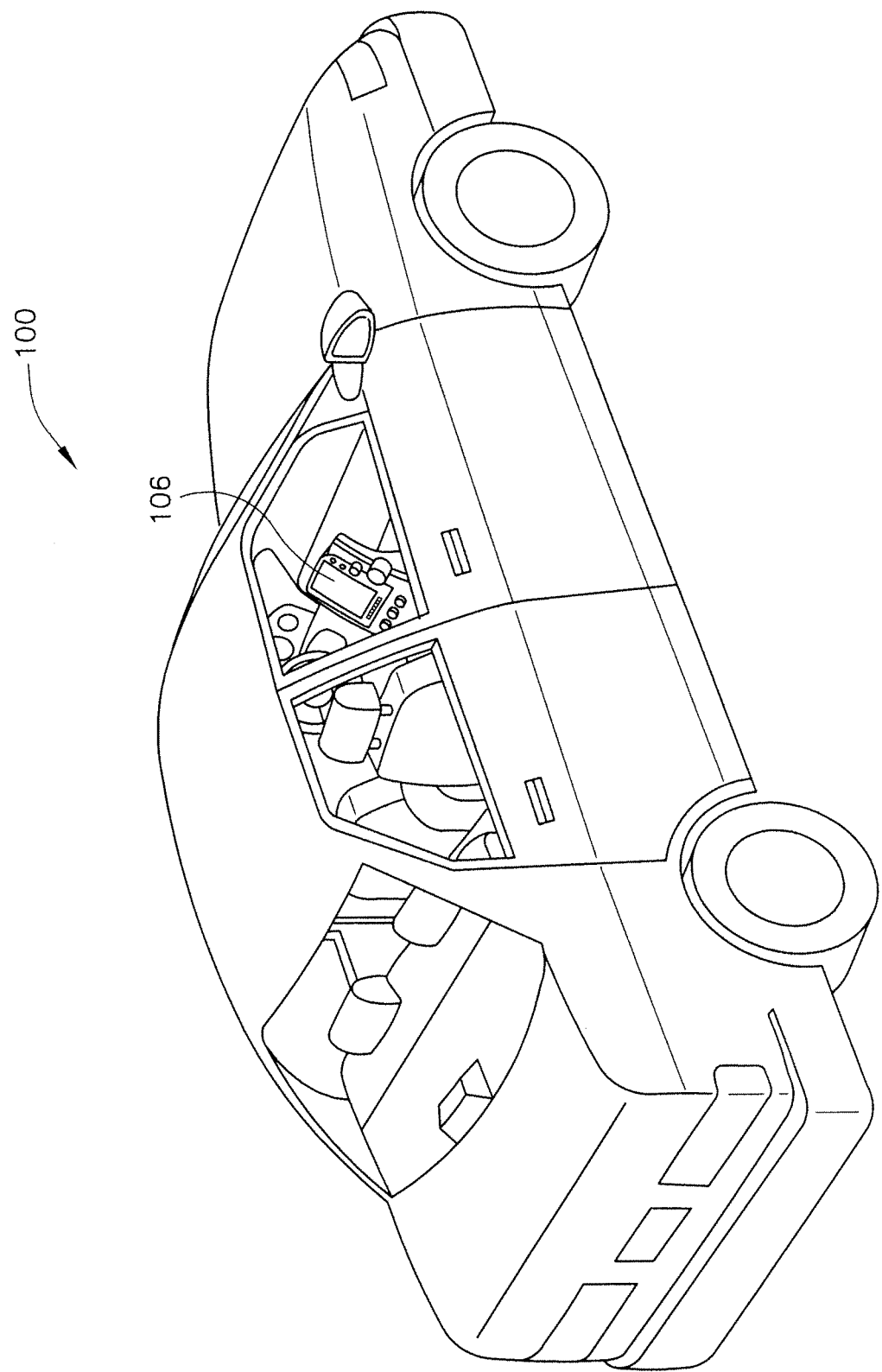
FIG. 5 is a perspective view of a motor vehicle that includes a number of vehicle systems, including an in-vehicle control system, according to one exemplary embodiment.

Referring to FIG. 5, a vehicle 10 includes a number of subsystems for user convenience and entertainment. Vehicle 10 generally includes a compass system, an audio system, a navigational system, a heating, ventilation, and air-conditioning system ("HVAC system"), and an in-vehicle control system 106 (e.g., media system, navigational system, entertainment system, etc.). These systems may be coupled to in-vehicle control system 106, which is capable of automatically and manually controlling and monitoring these systems.

It is noted that in various exemplary embodiments, vehicle 10, the compass system, the audio system, the navigational system, the HVAC system, and other vehicle systems may be of any past, present, or future design capable of interacting with in-vehicle control system 106.

An exemplary embodiment of in-vehicle control system may have various features. An in-vehicle control system generally includes an output display, one or more knobs, one or more pushbuttons, and one or more tactile user inputs or pushbuttons, which facilitate controlling various vehicle and media functions. In one exemplary embodiment, the pushbuttons are used to access the navigational menu. In another exemplary embodiment, the output display may be a touch-screen display, while in other exemplary embodiments it may be any other non-touch sensitive display. In still other exemplary embodiments, the output display may be of any technology (e.g., LCD, DLP, plasma, CRT), configuration (e.g., portrait or landscape), or shape (e.g., polygonal, curved, curvilinear). The knobs and pushbuttons may be configured: (i) to control the compass system; (ii) control functions of the navigational system, such as volume, map selection, address selection, display functionality, and command functionality; (iii) to control playback of media files over the sound system; (iv) to control retrieval of phonebook entries; (v) to control the function of the HVAC system such as fan speed, cabin temperature, for routing of air flow; or (vi) to control any other desired vehicle function.

According to an exemplary embodiment, the vehicle control system may be coupled to a signal receiver through a vehicle data bus. The vehicle data bus is an electronic communications network that interconnects components inside the vehicle. The signal receiver may be in communication with a variety of external devices, including a transmitter on a keychain. For example, a first driver of the vehicle may generally drive in a first geographic zone while a second driver may generally drive in a second geographic zone.

According to an exemplary embodiment an automobile includes an overhead console mounted to the roof of the vehicle during manufacture, although it could be separately added at a later time. The console includes a display panel, the center of which includes a digital display providing, in one embodiment, a 8-point compass display of the vehicle heading. In another embodiment, a 16-point compass display of the vehicle heading may be utilized. Also mounted in the console is the compass circuit shown in FIG. 6.

Figure 6:
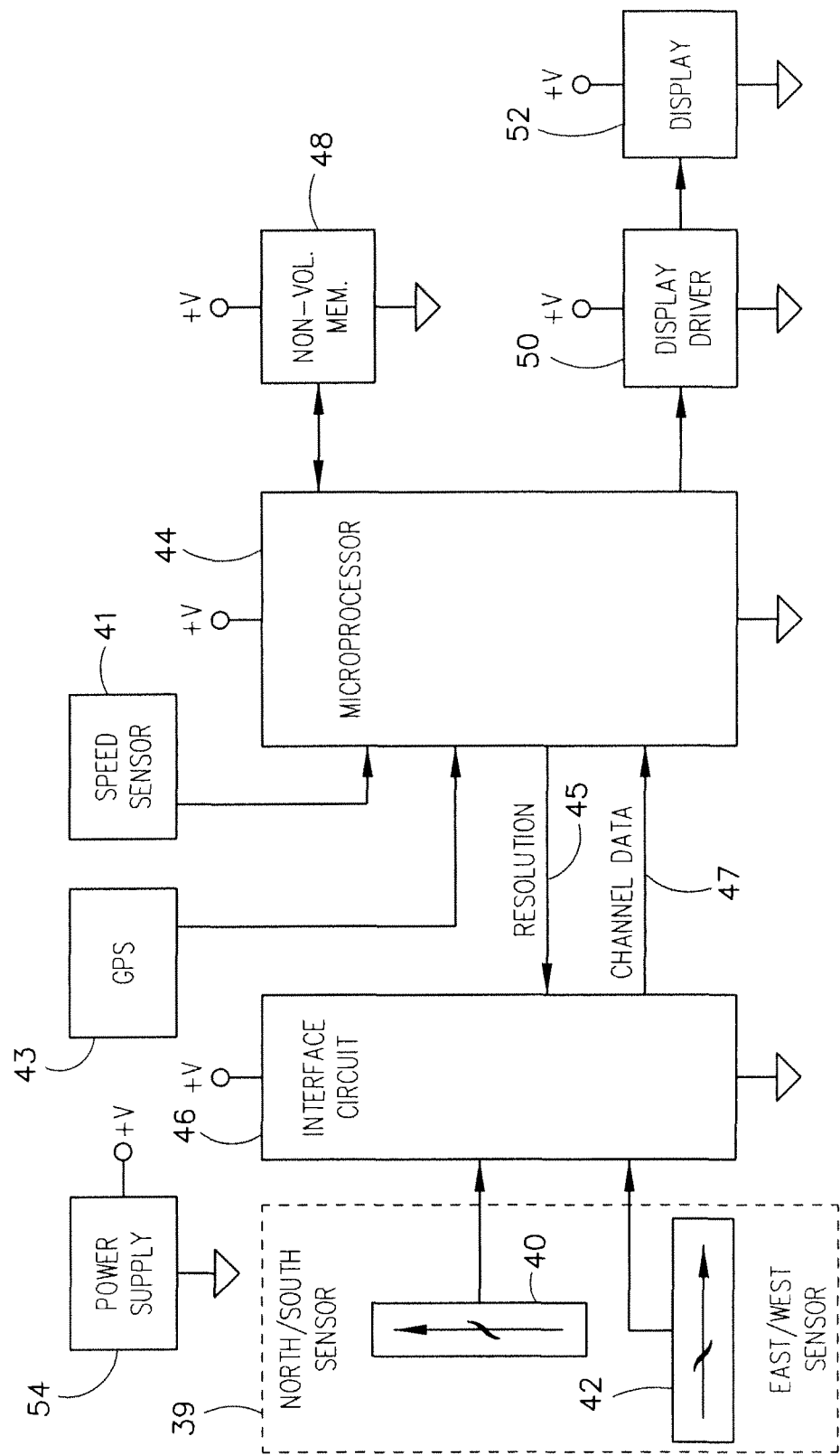
FIG. 6 is an electrical circuit diagram in block form of the compass system, according to an exemplary embodiment.

Referring now to FIG. 6, the compass system in an exemplary embodiment includes a magnetic field sensor 39 coupled to a microprocessor 44 through an electrical interface circuit 46. In this embodiment, sensor 39 is comprised of individual sensors 40 and 42 which sense separate orthogonal components of the earth's magnetic field, and microprocessor 44 is a HC08 8-bit microprocessor (i.e. Part No. MC68HC908EY16) manufactured by Freescale. Microprocessor 44 and interface circuit 46 are coupled via serial communication lines 45 and 47, and comprise a processing circuit for processing electrical signals supplied from sensors 40 and 42. Also coupled to microprocessor 44 in a conventional manner is a non-volatile memory circuit 48 for storing compass data, a speed sensor 41, a GPS device 43, a display driver 50, and a display 52 for displaying heading information to the operator of vehicle 10. Power supply circuit 54 provides operating voltage to the various electrical components of the compass system. The functioning and interconnection of these circuits is now described in greater detail.

Magnetic field sensors 40 and 42 sense the horizontal components of the magnetic field external to vehicle 10. Sensor 42 senses the east/west or Channel 1 components of the field, and sensor 40 senses the north/south or Channel 2 components of the field. As is described below, the magnetic field sensed by sensor 40 is said to have a positive polarity if it is in the north direction, and is said to have a negative polarity if it is in the south direction. Similarly, the magnetic field sensed by sensor 42 is said to have a positive polarity if it is in the east direction, and is said to have a negative polarity if it is in the west direction. Although the reference to the sensing directions of the sensors as being north, south, east, and west is literally accurate only when the vehicle is traveling north, these relative terms referring to direction are utilized hereinafter to refer to the component directions of the sensed external magnetic field. For example, sensor 40 is oriented to sense the component of the earth's magnetic field existing along an axis corresponding to the vehicle's direction of travel, and sensor 42 is oriented to sense the component existing in a direction perpendicular to vehicle 10 direction of travel.

In an exemplary embodiment, sensors 40 and 42 are magneto-inductive sensors, each having a wire-wound high magnetic permeability core constructed of Metglas 2705M available from Hitachi Metal Corporation. In an exemplary embodiment, the core has dimensions of 0.020 inch×0.600 inch×0.001 inch, and is wound with approximately 700 turns of 40 gauge AWG wire. In another exemplary embodiment, the core has dimensions of 0.020 inch×0.600 inch×0.001 inch, and is wound with approximately 2000 turns of 41 gauge AWG wire. As described in greater detail below, sensors 40 and 42 of this exemplary embodiment serve as inductive elements in an oscillator circuit formed with portions of interface circuit 46, with the inductance of a particular sensor being dependent on the magnitude of the magnetic field in that sensor's direction of measurement. Through the generation of electrical signals having a frequency that varies with the external magnetic field, vehicle 10 direction can be ascertained. Although sensors 40 and 42 are magneto-inductive sensors in this embodiment, other types of sensors, such as magneto-resistive sensors, can be implemented if appropriate changes are made to the compass system. Sensors 40 and 42 may also be replaced by a flux-gate sensor, magneto-resistive sensor, or any other way of measuring a magnetic field.

Figure 7:
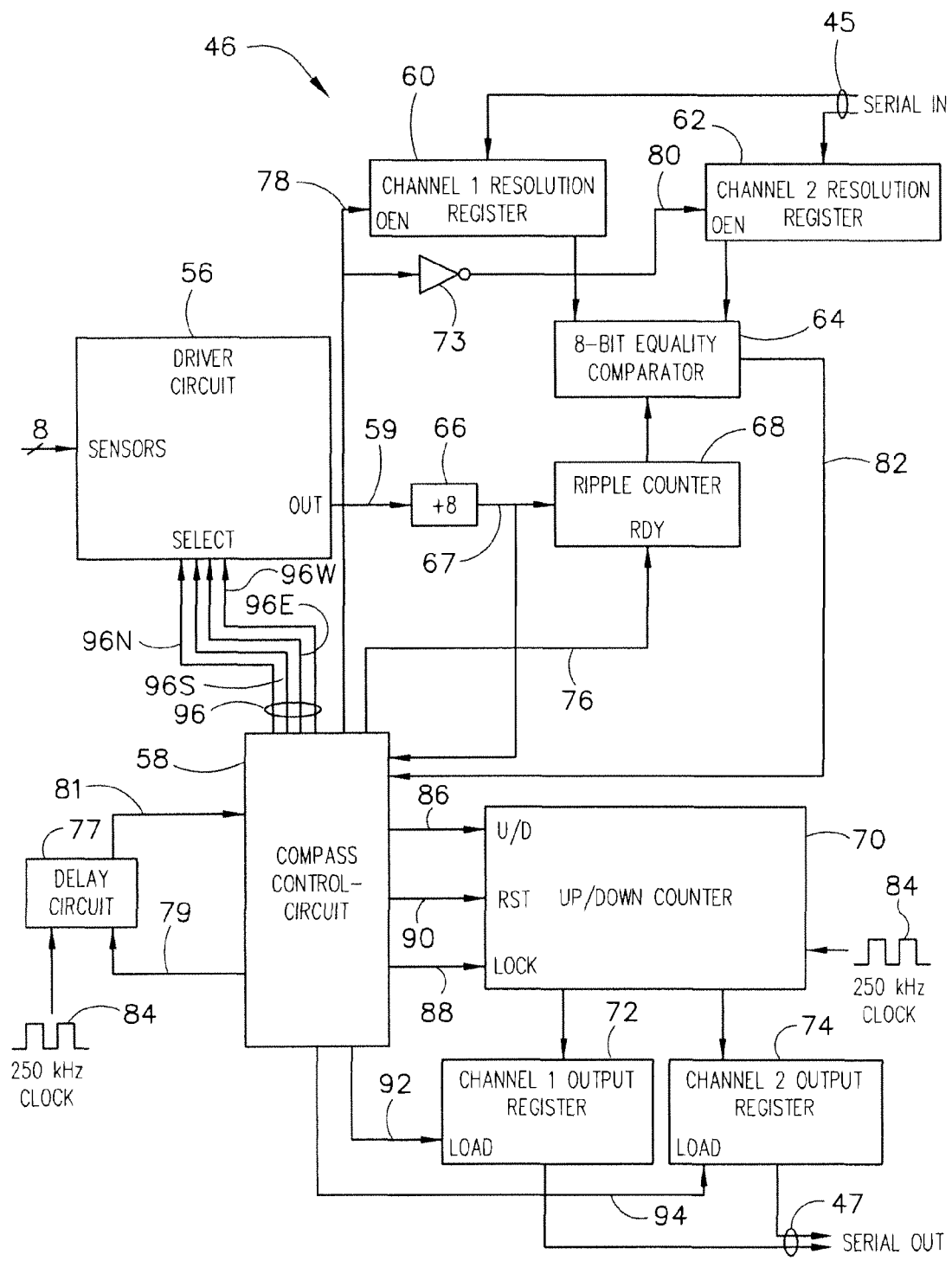
FIG. 7 is an electrical circuit diagram in block form of the interface circuit shown in FIG. 6, according to an exemplary embodiment.

Interface circuit 46 shown in FIG. 7 couples magneto-inductive sensors 40 and 42 to the microprocessor 44. In an exemplary embodiment, interface circuit 46 includes a driver circuit 56, a compass control circuit 58, an 8-bit Channel 1 resolution register 60, an 8-bit Channel 2 resolution register 62, an 8-bit equality comparator 64, a division circuit 66, an 8-bit ripple counter 68, a 16-bit up/down counter 70, a 16-bit Channel 1 output register 72, and a 16-bit Channel 2 output register 74. The functioning and interconnection of these circuits is now described in greater detail.

Figure 8:
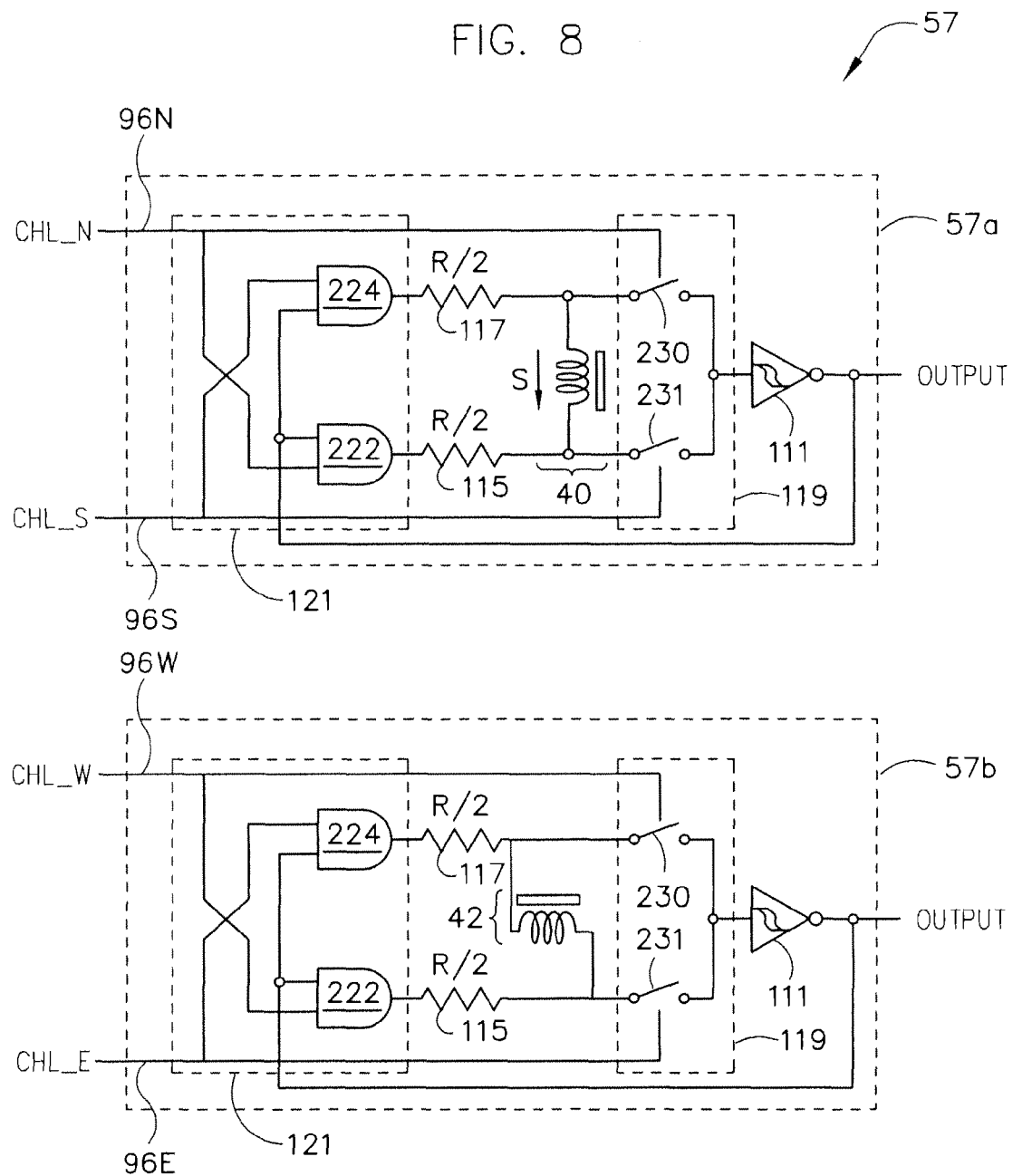
FIG. 8 is as electrical circuit diagram in schematic form of an exemplary oscillator used in the interface circuit shown in FIG. 6, according to an exemplary embodiment.

Driver circuit 56 of interface circuit 46 and sensors 40 and 42 form an oscillator circuit 57 in which sensors 40 and 42 serve as inductive elements and from which electrical signals are generated which represent the sensed magnetic field external to the vehicle. The structure of such a circuit is shown in FIG. 8 and disclosed in U.S. Pat. No. 5,239,264, issued on Aug. 24, 1993, entitled ZERO-OFFSET MAGNETOMETER HAVING COIL AND CORE SENSOR CONTROLLING PERIOD OF AN OSCILLATOR CIRCUIT, assigned to Precision Navigation, Inc., the disclosure of which is incorporated herein by reference. A brief description of the functioning of this circuit in connection with the other components of interface circuit 46 is now provided.

In order to obtain compass heading information, the output frequency of oscillator circuit 57 is dependent on the level of internal inductance of the sensors. Oscillator circuit 57 is configured such that each of sensors 40 and 42 serves as the inductive element of oscillator circuit 57 at alternating times as described in the above-mentioned patent. The level of inductance provided by sensors 40 and 42, and thus the output frequency of oscillator circuit 57, are dependent on the magnitude and direction of the external magnetic field as well as the direction of the magnetic field created by the current fed to the sensor. As shown in FIG. 8, oscillator circuit 57 includes a channel oscillator 57a for driving sensor 40 and a channel sensor 57b for driving sensor 42. Each channel oscillator 57a, 57b preferably includes a gating element 121 having AND gates 222 and 224 with inputs connected to the output of the channel oscillator and respective input enable lines 96N, 96S, 96E, and 96W that are coupled to compass control circuit 58. The outputs of AND gates 222 and 224 are respectively coupled to different ends of the sensors (40, 42) through impedance matched timing resistors 115 and 117. The two ends of each sensor 40, 42 are also connected to the input of a Schmitt trigger 111 via normally open switches 230 and 231, respectively. Switches 230 and 231 are independently controlled by the enable signals output from compass control circuit 58. By closing switches 230 and 231 one at a time, compass control circuit 58 changes the bias polarity of the channel oscillators 57a and 57b causing the channel oscillators to change the end of the sensor to which a driving current is supplied. The bias polarity of channel oscillator 57a is deemed to be positive if it is biased to apply current to the north end of sensor 40, and is negative if it is biased so as to apply current to the south end of sensor 40. Similarly, the bias polarity of channel oscillator 57b is deemed to be positive if it is biased to apply current to the east end of sensor 42, and is negative if it is biased so as to apply current to the west end of sensor 42. As shown in FIG. 8, oscillator circuit 57 is configured so that each of sensors 40 and 42 can be fed current from either of their ends. The detailed operation of oscillator 57 is described in U.S. Pat. No. 5,239,264, hereby incorporated by reference.

The frequency of the signal output from oscillator circuit 57, which is dependent on the magnitude and direction of the external magnetic field and the bias polarity of the channel oscillator connected therein, has a base or zero magnetic field frequency when no magnetic field is present in the measurement direction of the connected sensor. With a positive bias polarity of channel oscillator 57a, the output frequency of oscillator circuit 57 decreases from this base frequency when the magnetic field strength increases in the north (positive) direction, and increases from the base frequency when the magnetic field strength increases in the south (negative) direction. If the bias polarity of channel oscillator 57a is negative, then the output frequency of oscillator circuit 57 increases from the base frequency when the magnetic field strength increases in the north (positive) direction, and decreases from the base frequency when the magnetic field strength increases in the south (negative) direction. When channel oscillator 57b has a positive bias polarity, the output frequency of oscillator circuit 57 decreases from the base frequency when the magnetic field strength increases in the east (positive) direction, and increases from the base frequency when the magnetic field strength increases in the west (negative) direction. If the bias polarity of channel oscillator 57b is negative, then the output frequency of oscillator circuit 57 increases from the base frequency when the magnetic field strength increases in the East (positive) direction, and decreases from the base frequency when the magnetic field strength increases in the West (negative) direction. Thus, by analyzing the output frequency of oscillator circuit 57 when a channel oscillator is biased at a known bias polarity and comparing that frequency to the base frequency, compass heading information may be obtained. Furthermore, measuring the difference in frequency between the two bias polarities, the ambient magnetic field can be determined. The ambient magnetic field information can be utilized to obtain the compass heading data.

Interface circuit 46 analyzes the electrical signals provided by oscillator circuit 57 by determining for each channel oscillator a frequency difference between signals output from oscillator circuit 57 for each different bias polarity. Specifically, interface circuit 46 measures the output frequency by converting the electrical signals into data signals and determining the time period measured as the number of fixed duration "counts" required for the signals from oscillator circuit 57 to complete a particular number of cycles. The count value increases as the frequency of oscillation decreases. For each channel, interface circuit 46 measures the number of counts required for signals output from oscillator circuit 57 to complete a particular number of cycles for each bias polarity of the corresponding channel oscillator and determines a difference in the number of counts associated with the two different bias polarities of the corresponding channel oscillator. By calculating the difference between the count values associated with the positive and negative bias polarities of each channel oscillator, a zero-compensated count value, or data signal, is generated for each sensor. Such a count value represents the actual field strength in the measurement direction of a sensor and is zero if the magnetic field is zero. As described in greater detail below, each count of these zero-compensated count values represents a particular level of magnetism, with the milligauss to count ratio of a count value determined by the number of cycles completed by oscillator circuit 57 for both bias polarities of the channel oscillator generating that zero-compensated count value. A description of the individual components of interface circuit 46 to implement the bias polarity switching method is now described.

Referring to FIG. 7, Channel 1 resolution register 60 is an 8-bit register that stores a value which determines the number of cycles to be completed by the output signal of oscillator circuit 57 for the measurement period of each bias polarity of channel oscillator 57a. Similarly, Channel 2 resolution register 62 is an 8-bit register that stores a value which determines the number of cycles to be completed for the measurement period of each bias polarity of channel oscillator 57b. As described below, these values determine the level of resolution achieved by the compass system and may be adjusted by microprocessor 44 by means of adjustment signals via input line 45. Division circuit 66 receives the electrical signal generated by oscillator circuit 57 via line 59 and divides this signal by a particular number (8 in the preferred embodiment). The resulting signal is supplied to ripple counter 68 via line 67. Ripple counter 68 is an 8-bit counter that counts the number of cycles completed by the input signal received from division circuit 66. As described below, ripple counter 68 counts the number of cycles completed for each bias polarity of the channel oscillators for each of sensors 40 and 42, with the counter being cleared before each counting period by means of connection to compass control circuit 58 via line 76. The electrical signal generated by oscillator circuit 57 is divided by circuit 66 before being input to ripple counter 68, thus dividing the frequency of the signal by 8 (in the preferred embodiment), because it is desirable to enable 8-bit ripple counter 68 (capable of counting to 255) to count more than the equivalent of 255 cycles of the original electrical signal. By counting more cycles, ripple counter 68 enables the compass system to work with more averaged sensor information which is more reliable.

Equality comparator 64 of FIG. 7 is an 8-bit comparator which compares the value of ripple counter 68 with the stored value of whichever one of resolution registers 60 or 62 is enabled by compass control circuit 58 via lines 78 or 80. Line 80 has an inverter 73 placed between line 78 and Channel 2 resolution register 62. If the two compared values are equal, comparator 64 outputs a signal (REQUAL=1) to compass control circuit 58 via line 82. Up/down counter 70 is a 16-bit counter that serves to calculate the time period or count value required for a particular number of cycles to be completed by the output signal from oscillator circuit 57 which is eventually indicated by an output signal (REQUAL=1) from equality comparator 64 sent to compass control circuit 58. As described below, up/down counter 70 ultimately holds the difference between the count values measured during the two bias polarities of the channel oscillator for a particular sensor. Via input line 84, up/down counter 70 counts according to a clock signal having a frequency which is selected such that up/down counter 70 will not roll over (count beyond its measurement range) when making its time period calculations. In the preferred embodiment, the clock frequency is 250 kHz. The counting of up/down counter 70 is controlled by its multiple connections with compass control circuit 58, with a signal (U/D) applied on the U/D input line 86 determining whether up/down counter 70 counts up or down, a signal (ENABLE) applied on the Lock input line 88 enabling up/down counter 70 to be locked at a particular measurement reading (for reasons discussed below), and a signal (CLEAR) applied to the RST input line 90 enabling up/down counter 70 to be cleared. Compass control circuit has an output line 79 which is connected to delay circuit 77. Delay circuit 77 also has an input from a clock via line 85. In the preferred embodiment, the clock frequency is 250 kHz. Delay circuit 77 then provides a signal to compass control circuit 58 via output line 81. Channel 1 and Channel 2 output registers 72 and 74 are 16-bit registers and, depending on which is enabled by compass control circuit 58 via a signal (Latch_N) on a first line 92 or a signal (Latch_E) on a second line 94, one receives and stores the count value held in up/down counter 70. This zero-compensated count value, or data signal, is available to microprocessor 44 via output line 47. Compass control circuit 58 is configured as a conventional state machine and controls the functioning of interface circuit 46.

In an exemplary embodiment, the compass system calculates the deviation coefficients, which enables a compass error factor to be utilized on any course heading to correct for any noise sources. In this exemplary embodiment, the compass system is actively corrected based on the compass' deviation coefficients. The deviation coefficients are the coefficients in the deviation formula (see Paragraph 70). Deviation is the difference between the magnetic compass heading and the true compass heading. The deviation in the compass system is caused by a variety of magnetic noise sources (i.e. the vehicle moveable members or magnetic field sources, such as, sunroof, door, electronic windows, HVAC system, motors, window defrost system and the lighting system). In an exemplary embodiment, the deviation analysis measures the deviation or on error multiple headings (i.e. usually 8 cardinal headings) and uses this data to quantify the deviation for each noise source. Since these noise sources can be quantified, a correction factor can be calculated for these noise sources to offset the negative impact or false reading on the compass system caused by these noise sources.

In an exemplary embodiment, the deviation analysis consists of determining the approximate value of each of the six deviation coefficients. The six deviation coefficients enable the compass system to automatically adjust the compass system based on the magnetic properties of vehicle 10. In an exemplary embodiment, the adjustments can be either physical and/or electronic, such as, the placement of various correction devices (i.e. steel balls) and/or the transmission of electric-adjustment signals.

In an exemplary embodiment, the first step in a deviation analysis is to record the deviation on each cardinal and intercardinal heading by the compass to be analyzed. For example, easterly deviation will be considered positive (+), and westerly deviation negative (−). Approximate values of the various coefficients are:

Coefficient A—mean of deviation of all headings;

Coefficient B—mean of deviation of headings 090° and 270°, with sign at 270° reversed;

Coefficient C—mean of deviation on headings 000° and 180°, with sign at 180° reversed;

Coefficient D—mean of deviation on intercardinal headings, with signs at headings 135° and 315° reversed;

Coefficient E—mean of deviation on cardinal headings, with signs at 090° and 270° reversed; and Coefficient J—change of deviation for a roll of 1° while vehicle 10 heads 000° by compass. It is considered positive if the north end of the compass card is drawn toward the low side, and negative if toward the high side.

A semicircular deviation is easterly throughout approximately 180° of heading and westerly throughout the remainder which indicates that its sign remains unchanged throughout a semicircle. A semicircular deviation can be caused by permanent magnetism induced in vertical soft iron. A quadrantal deviation changes signs in each quadrant. The quadrantal deviation is easterly in two opposite quadrants and westerly in the other two. The quadrantal deviation is caused by induced magnetism in horizontal soft iron. These types of deviation resulting from the various parameters are called coefficients.

There are six coefficients. First, coefficient A is a constant on all headings. In an exemplary embodiment, when coefficient A is derived from a magnetic source, as from an asymmetrical combination of parameters, it is a "true" constant. In another exemplary embodiment, when coefficient A is derived from a mechanical source, as from an incorrectly placed mechanical device (i.e. a ferrous object), or mathematical, as from an error in computation of magnetic azimuth, it is an "apparent" constant.

Second, coefficient B is semicircular deviation, which is proportional to the sine of the compass heading. It is maximum on compass headings east or west, and zero on compass headings north or south. In an exemplary embodiment, coefficient B is caused by permanent magnetism, and also by induced magnetism in asymmetrical vertical soft iron.

Third, coefficient C is semicircular deviation, which is proportional to the cosine of the compass heading. It is maximum on compass headings north or south, and zero on compass headings east or west. In an exemplary embodiment, coefficient C is caused by permanent magnetism or by induced magnetism in asymmetrical vertical soft iron orientated perpendicularly to the longitudinal axis of the compass.

Fourth, coefficient D is quadrantal deviation, which is proportional to the sine of twice the compass heading. It is maximum on intercardinal compass headings, and zero on cardinal compass headings. In an exemplary embodiment, coefficient D is caused by induced magnetism in horizontal soft iron which is symmetrical with respect to the compass.

Fifth, coefficient E is quadrantal deviation, which is proportional to the cosine of twice the compass headings. It is maximum on cardinal compass headings, and zero on intercardinal compass headings. In an exemplary embodiment, coefficient E is caused by induced magnetism in horizontal soft iron which is asymmetrical with respect to the compass.

Sixth, coefficient J is the change of deviation for a role of 1° while vehicle 10 is on compass heading 000°. The force components producing these coefficients are called exact coefficients.

For example, a magnetic compass which has not been adjusted has deviation on cardinal and intercardinal compass headings as illustrated in FIG. 9.

On heading compass north the deviation is 13°.5 W when vehicle 10 rolls 10° to the vehicle's 10 right.

The analysis requires the approximate value of each coefficient. Therefore, the solution is A(+)2°.3, B(+)30°.0, C(−)4°.8, D(+)13°.8, E(+)1°.1, J(−)1°.2 based on the calculations below:

$$A = \frac{-1°.5 + 34°.0 + 31°.0 + 13°.5 + 8°.0 - 1°.5 - 29°.0 - 36°.0}{8} = (+)2°.3$$

$$B = \frac{31°.0 + 29°.0}{2} = (+)30°.0$$

$$C = \frac{-1°.5 - 8°.0}{2} = (-)4°.8$$

$$D = \frac{34°.0 - 13°.5 - 1°.5 + 36°.0}{4} = (+)13°.8$$

$$E = \frac{-1°.5 - 31°.0 + 8°.0 + 29°.0}{4} = (+)1°.1$$

$$J = \frac{-13°.5 + 1°.5}{10} = (-)1°.2$$

On any compass heading (CH) the deviation (d) from each coefficient acting alone is:

Coefficient A: $d_A$=A

Coefficient B: $d_B$=B sin CH

Coefficient C: $d_C$=C cos CH

Coefficient D: $d_D$=D sin 2CH

Coefficient E: $d_E$=E cos 2CH

Coefficient J: $d_J$=J cos CH

For vehicle 10 that is not rolling, the total deviation on any compass heading is the algebraic sum of the deviation due to each of the first five coefficients:

$$d=d_A+d_B+d_C+d_D+d_E=A+B \sin CH+C \cos CH+D \sin 2CH+E \cos 2CH.$$

For the compass of the example given above, the deviation due to each component, and the total, on various headings are illustrated in FIG. 10.

The various components and the total deviation are shown in geographical form in FIG. 11. In this exemplary embodiment, coefficient A is shown to be negligible. In this exemplary embodiment, the presence of more than 2° of constant error indicates an abnormal condition which should be discovered and corrected. Coefficient E is normally negligible for a compass located on the center line of vehicle 10. In this exemplary embodiment, vehicle has an excessive amount of coefficient E, which should be corrected by slewing the quadrantal correctors.

If rolling error is measured on any heading other than compass north or south, the value of coefficient J can be found by means of the formula:

$$J = \frac{d}{\cos CH}$$

or $$J = d \sec CH$$

If RE is the total observed change of deviation (rolling error), and i is the angle of roll in degrees (for relatively small angles), the formula becomes $$J = \frac{RE \sec CH}{i}.$$

If rolling error is sought, the formula becomes $$RE = Ji \cos CH.$$

In an exemplary embodiment, the deviation analysis utilizes a Global Positioning System (GPS) or any other positioning system to provide the data for the reference heading. Vehicle 10 is driven in a complete circle to provide the deviation between the compass heading and the GPS heading. It should be noted that this method may also be used during normal driving patterns. The compass heading data points and GPS heading data points are stored in an onboard memory device. These data points are utilized to calculate coefficient A, coefficient B, coefficient C, coefficient D, coefficient E and coefficient J. Since these noise sources affecting the compass can be quantified, these noise sources can be offset to correct the compass system and provide the user with accurate heading information.

It should be noted that deviation analysis is applied to an electronic compass and that corrections for coefficient A, coefficient B, coefficient C, coefficient D, coefficient E and coefficient J errors are determined and implemented for an electronic compass. For example, in an electronic compass if a coefficient E error is determined, then we can adjust the heading output when traveling on Cardinal headings because that is where the maximum error occurs for coefficient E.

In a wet compass, coefficient B and coefficient C errors can be corrected by adjustable magnets placed in different orientations and distances from the compass card. In an exemplary embodiment, the electronic compass may correct for coefficient B and coefficient C errors by using a GPS heading source along with a magnetic field model. The magnetic calculations may be done in parallel with the deviation analysis and/or magnetic model calculations and the optimal solution selected. This method may be used if a magnetic shift occurs in the vehicle, which can occur when the vehicle is driven in a magnetic shift occurrence environment (e.g., driving over a subway). In this exemplary embodiment, the compass heading and the GPS heading will not be similar. The deviation analysis may then be used to quantify the type of compass error as the vehicle is driven. The magnetic model and vehicle heading may be used to determine the correction factor based on the coefficient B and coefficient C errors. In another exemplary embodiment, the deviation analysis could be done to continually update the compass. In exemplary embodiments, the compass could detect a magnetic shift and adjust the compass calibration. The system may determine if this adjustment and adjusted calculated compass heading matched the current direction indicated by the GPS or if this adjustment and adjusted calculated compass heading matched the deviation analysis and magnetic field model.

In an exemplary embodiment, coefficient D errors may be caused by the Earth's magnetic field being distorted by the metal in the vehicle or by a mismatch in gain between sensors. In an exemplary embodiment, utilizing a GPS and a magnetic field model the optimal radius could be determined. The coefficient D error may be a maximum on the intercardinal headings and the deviation coefficients may be used to determine when to correct the compass based on the intercardinal headings. In an exemplary embodiment, the longitude position and latitude position may be determined (e.g., GPS) for the vehicle. Based on this information and a magnetic field model, the horizontal field strength of the Earth can be determined. Utilizing the horizontal field strength of the Earth and the vehicle's heading the permanent magnetism in the compass (e.g., coefficient B and coefficient C) may be determined along with the error due to field distortions and sensor gain (e.g., coefficient D and coefficient E).

For example, if after driving on 8 cardinal headings, the analysis reveals that there is a constant deviation of 4 degrees. In this exemplary embodiment, the compass system is configured to calculate that the probable source of this error is from a geographic zone error because the compass is mounted in a fixed position in vehicle 10. The geographic zone error is caused by the difference between true north and magnetic north. In this exemplary embodiment, the source of the error could be from another noise source but the correction factor would still be quantified (i.e. 4 degrees). After the compass system determines the correction factor based on this analysis, the correction factor is automatically applied to the compass system.

For more information regarding FIGS. 9-11, see "American Practical Navigator: Bowditch" a work published by the US Navy Hydrographic Office.

In this exemplary embodiment, the owner of vehicle 10 no longer needs to manually adjust the compass for this geographic zone error by examining the owner's manual and entering in the compass error factor for this particular geographic zone. The owner's manual's magnetic field model could be based on magnetic field models published by the United State Geological Society.

The magnetic-field models used are succinct mathematical descriptions of the Earth's surficial magnetic field. They are constructed by fitting a set of basis functions, usually spherical harmonics or spherical caps, to magnetic data, such as those collected at United States Geological Society's observatories. The models are interpolators for estimating the field between measurement locations and between measurement times. The calculations for these models are available at http://geomag.usgs.gov/models/.

These models published by the United State geological society have at least three sources of error. First, the models are only approximations of the magnetic field. Second, these models become outdated every few years because the Earth's magnetic field shifts. This magnetic field shift can be one degree every several years. Third, these models are predictive, in that they are based on data collected in the recent past, preceding their construction, and are intended to represent the field in the near future, following their construction.

Further, magnetic-field models and charts have limitations. Since the magnetic field is extremely complicated, in both space and time, magnetic-field models are, by practical necessity, something of an approximation of the actual magnetic field. For example, global models of the field, such as the IGRF, do not account for very local magnetization. Indeed, there is no way that they could, since many geological formations, and for that matter, many rocks, are magnetized, if only partially. Moreover, the models do not fully account for magnetic-field ingredients generated by ionospheric and magnetospheric electric currents, since these can create essentially unpredictable, localized and transient perturbations to the main field, particularly at high latitudes.

Figure 12A:
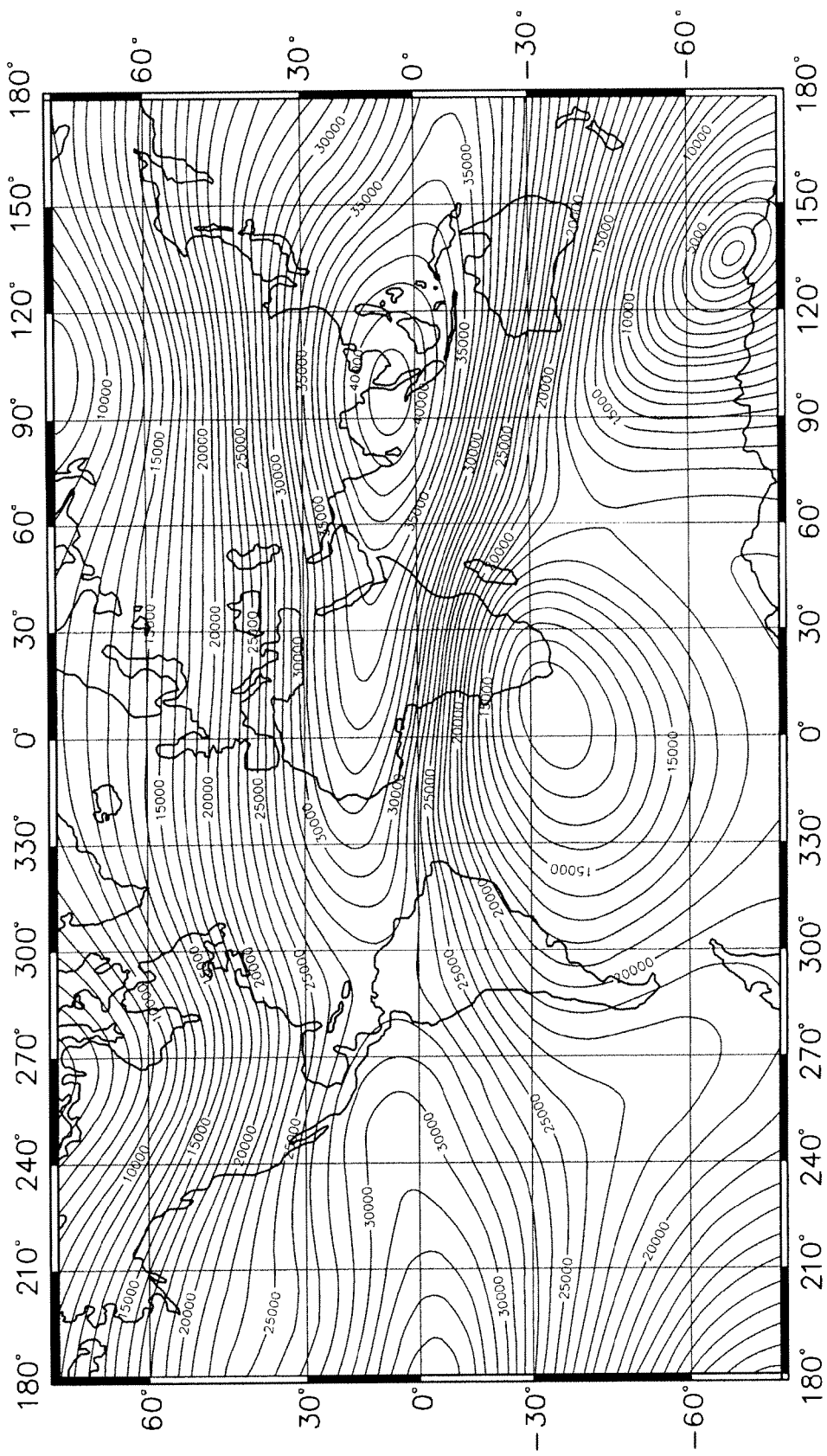
FIG. 12A is a graphical model of a magnetic field model of the earth, according to an exemplary embodiment.

FIG. 12A shows a magnetic field map of the earth. FIG. 12B shows a magnetic field map of a portion of the earth, focusing on North America. In another exemplary embodiment, the compass system is configured to retrieve the geographic zone error factor from an onboard database and apply the geographic zone error factor to the compass system. The geographic zone error factor is based on the location of the compass derived from a GPS signal. In an exemplary embodiment, the onboard database is configured to update the geographic zone error factors via the internet to ensure that the most recent data is being utilized. In another exemplary embodiment, the compass system could download the geographic zone error factors directly via the internet with no requirement for an onboard database.

In another exemplary embodiment, the compass system would continually or on a predetermined interval recalibrate the system based on which geographic zone the compass was located in. In this exemplary embodiment, an owner could drive vehicle 10 across geographic zone (i.e. cross country trip) or move to a new geographic zone and the compass system would automatically recalibrate to the new geographic zone upon entry into this new geographic zone. In FIG. 12B, a driver could start a trip from a first position 301 in a first geographic zone 303 to a second position 305 in a second geographic zone 307. The compass system would enter new geographic zone error factors upon entry a third geographic zone 309, a fourth geographic zone 311 and the second geographic zone 307. In another exemplary embodiment, the compass system could be configured to provide buffer zones around the geographic zones to minimize the number of times the system recalibrates. The buffer zones could be configured to reduce the memory and/or processing requirements for vehicle 10 that was located at the boundary line of two geographic zones.

In an exemplary embodiment, the compass system is configured to determine the direction of vehicle 10 and magnetic field strength of the particular location which is derived from a magnetic field model. These determinations are based on the location and heading of vehicle 10 which is determined from GPS signals. Since the compass system has determined the direction of vehicle 10 and the magnetic field strength, the compass system can calculate the center point of the magnetic pattern. In this exemplary embodiment, the center point/reference point could be the current magnetic position minus a proportion of the local field strength on the designated channels. Since the compass system can determine the center point, direction of vehicle 10 and the magnetic field strength, the compass system can continually and instantaneously recalibrate.

Figure 13:
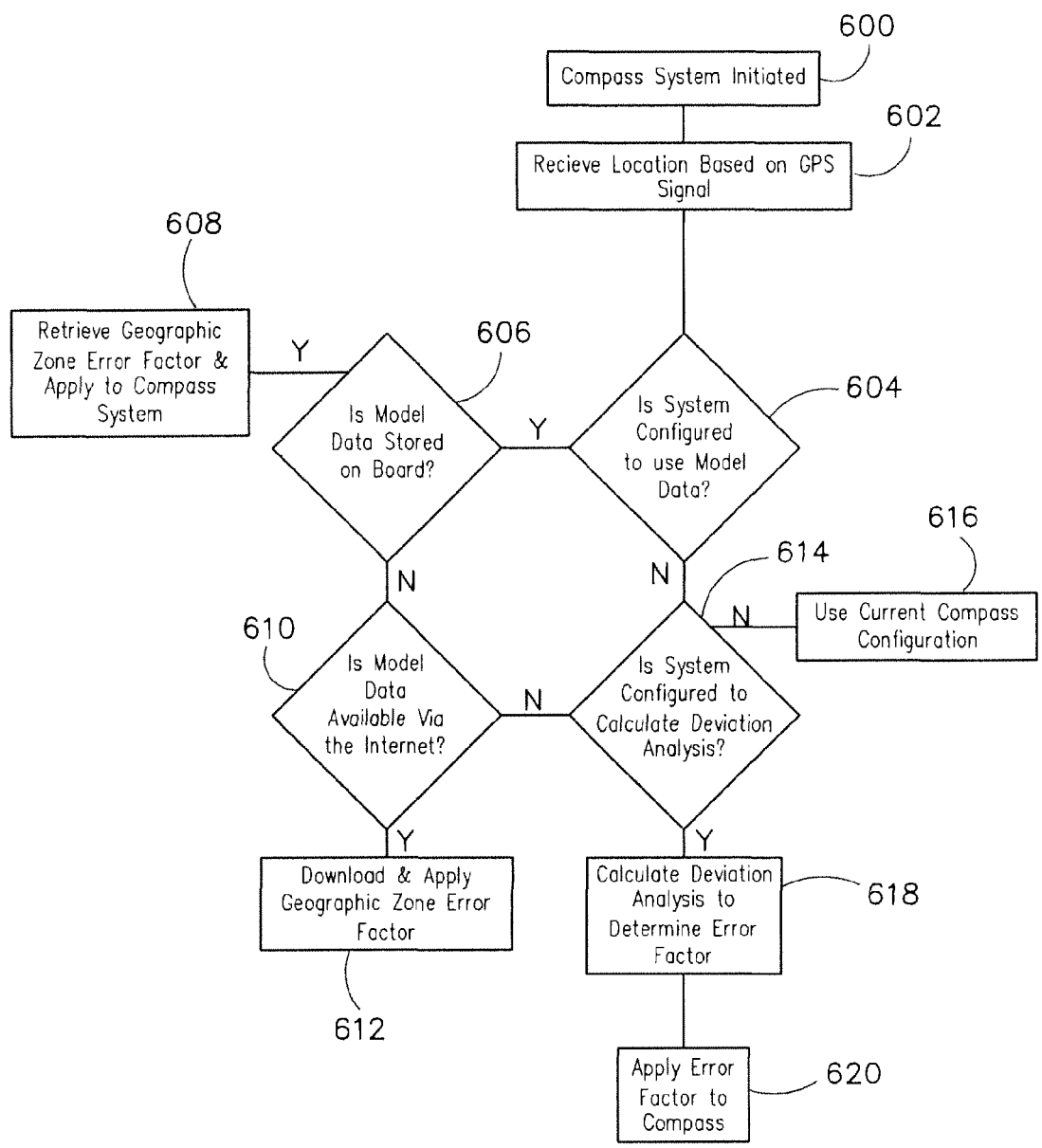
FIG. 13 is an illustrative process flow, according to an exemplary embodiment.

In FIG. 13, an exemplary method of calibrating the compass system is shown. The compass system is initiated (step 600). The compass system receives a location signal from the GPS (step 602). The compass system determines whether the compass error factor is to be derived from a magnetic field model (step 604). If the compass system is to use the magnetic field model, the compass system moves to step 606. The compass system determines whether the magnetic field model is stored onboard vehicle 10 (step 606). If the magnetic field model is stored onboard vehicle 10, then the system moves to step 608 to retrieve the geographic zone error factor and apply the geographic zone error factor to the compass system. If the magnetic field model is not stored onboard vehicle 10, then the system moves to step 610 to determine whether the magnetic field model is available via the internet. If the magnetic field model is available, the compass system moves to step 612 to download and apply the specific geographic zone error factor. If the magnetic field model is unavailable or the compass system is not configured to use a magnetic field model, the compass system moves to step 614.

The compass system determines whether it is configured to calculate and utilize the deviation analysis (step 614). If the compass system is not configured to calculate and utilize the deviation analysis, then the compass system uses the current compass configuration (step 616). If the compass system is configured to calculate and utilize the deviation analysis, then the compass system calculates the deviation analysis to determine the compass error factor (step 618). The compass system applies the compass error factor to the compass system (step 620).

Figure 14:
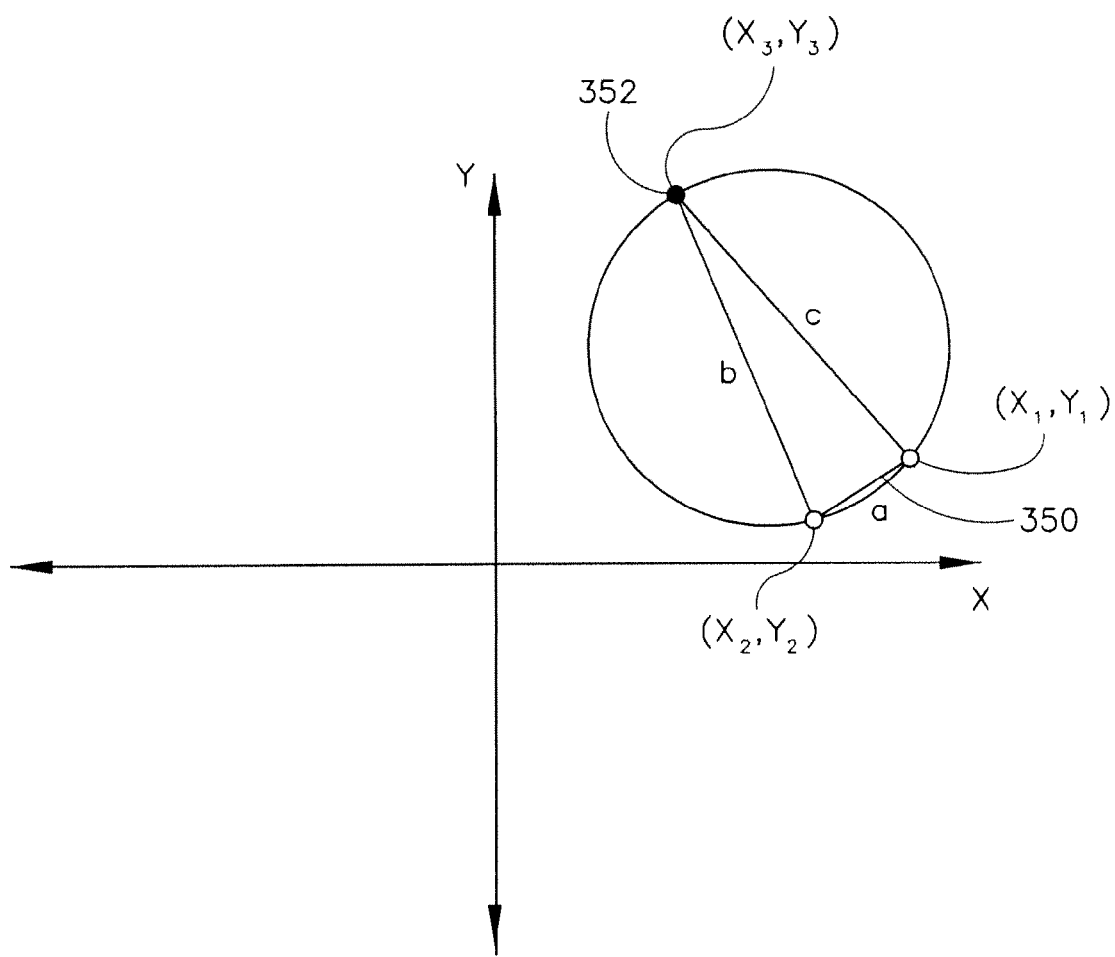
FIG. 14 is an illustrative model showing an example of calculating the center/reference point on a vehicle moving in an arc pattern, according to an exemplary embodiment.

In FIG. 14, a technique to determine a center point/reference point 352 is shown. In this exemplary embodiment, vehicle 10 could be driven in a small arc pattern 350. Based upon the angle change measured from the GPS heading and the magnetic change measured from the compass, the field strength can be calculated and center point/reference point 352 determined. The deviation analysis can be completed and the coefficients can be used to correct for any elliptical errors that are present based on driving vehicle 10 in small arc pattern 350.

In another exemplary embodiment, the compass system can continuously monitor and adjust the compass' calibration magnetically, which can be compared with the deviation analysis. In this exemplary embodiment, the compass system recalibration process would be enhanced because the heading would be based on multiple recalibration techniques and the compass system could utilize the multiple sources of data to determine which technique, an averaging of the techniques, a weighted average of the techniques, a percentage range techniques, or any combination thereof provides the optimal solution. In an exemplary embodiment, the compass system is configured to utilize the heading data provided from the GPS when vehicle 10 is traveling at or above a first threshold speed. In another exemplary embodiment, the compass system is configured to utilize the heading data provided by the compass when vehicle 10 is in an urban canyon or the vehicle is traveling at or below a second threshold speed. In another exemplary embodiment, the compass system is configured to utilize a moving average, a weighted average, a simple average, a percentage range average or any combination thereof to determine the optimal solution. For example, the percentage range technique could be applied which would analyze the three compass error factors. In this example, error factor 1 is 3 percent, error factor 2 is 3.3 percent and error factor 3 is 2 percent. The system would determine whether the error factors were within a specific percentage (i.e. 10 percent) of each other. If more than one error factor was within the specific percentage of another error factor, the system would average all of the error factors that were within this specific percentage and discard any error factors that were outside this specific percentage. In this example, error factor 1 and error factor 2 are within a 10 percent of each other while error factor 3 is outside of this predetermined range. Therefore, the compass system would average error factor 1 and error factor 2 together to apply an error factor of 3.15 to the compass system.

In an exemplary embodiment, the small arc turned by the vehicle allows the compass/GPS system to estimate the magnetic field strength. In another exemplary embodiment, the compass may be instantly magnetically calibrated based on knowing the field strength and the vehicle heading. The field strength may be known from the small arc turned by the vehicle or by normal magnetic calibration.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the compass system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations of the present application could be accomplished with standard programming techniques with rule-based logic and other logic to accomplish the various connection steps, processing steps, comparison steps and decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art. All structural, chemical, and functional equivalents to the elements of the below-described application that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. Furthermore, no element, component or method step in the present disclosure is intended to be dedicated to the public, regardless of whether the element, component or method step is explicitly recited in the claims.

What is claimed is:

1. A device for use with a compass, the device comprising:
an input for receiving signals from the compass;
a memory device; and
a processing circuit configured to determine magnetic compass headings using the signals received from the compass;
wherein the processing circuit is further configured to determine true headings;
wherein the processing circuit is configured to calculate a deviation for each of a plurality of headings, each deviation comprising a difference between a magnetic compass heading and a true heading;
wherein the processing circuit is configured to use the deviations for each of the plurality of headings to calculate a plurality of compass deviation coefficients representative of different types of noise sources;
wherein at least one compass deviation coefficient is determined based on a database of geographic zone error factors stored in the memory device and based on a position of the compass;
wherein the processing circuit is configured to update the database of geographic zone error factors using an internet connection; and
wherein the processing circuit is configured to store the deviation coefficients in memory and to at least one of calibrate the compass and adjust an output from the compass using the compass deviation coefficients.

2. The device of claim 1, wherein the compass deviation coefficients comprise:
a mean deviation of at least two cardinal headings;
a mean deviation of at least two intercardinal headings; and
a mean deviation relative to headings including at least one cardinal heading and at least one intercardinal heading.

3. The device of claim 2, wherein the processing circuit is configured to update an information structure that relates compass headings in the at least two cardinal headings and the at least two intercardinal headings to calculated deviations.

4. The device of claim 1, wherein the processing circuit is configured to use the compass deviation coefficients to affect the compass output differently when a magnetic compass heading indicates movement in a first direction relative to movement in a second direction.

5. The device of claim 1, wherein the processing circuit is configured to update an information structure that relates magnetic compass headings to a plurality of calculated deviation components for each compass deviation coefficient.

6. The device of claim 5, wherein the processing circuit is configured to lookup pre-calculated deviation components for a new magnetic compass heading when the compass is in a normal operation mode.

7. The device of claim 1, further comprising:
a second input for receiving positioning signals from a global positioning system;
wherein the processing circuit is configured to use the positioning signals from the global positioning system to determine the true headings.

8. The device of claim 1, wherein the processing circuit is further configured to apply a new magnetic compass heading to the stored compass deviation coefficients to obtain a total deviation relative to the new magnetic compass heading.

9. The device of claim 1, wherein the processing circuit is configured to determine if the database of geographic zone error factors is stored in the memory device, and wherein the processing circuit is configured to download the database of geographic zone error factors from the internet in response to determining that the database of geographic zone error factors is not stored in the memory device.

10. The device of claim 1, wherein the database of geographic zone error factors is stored remote from the memory device, and wherein the processing circuit downloads and applies a geographic zone error factor from the database of geographic zone error factors.

11. A method for calibrating a compass using a processing circuit, the method comprising:
receiving signals from the compass at the processing circuit;
using the processing circuit to determine magnetic compass headings based on the signals received from the compass;
determining true headings using the processing circuit;
updating a database of geographic zone error factors using an internet connection;
using the processing circuit to calculate a deviation for each of a plurality of headings, each deviation comprising a difference between a magnetic compass heading and a true heading;
using the processing circuit to calculate a plurality of compass deviation coefficients based on the deviations for each of the plurality of headings and based on both the updated database of geographic zone error factors stored in a memory device and a position of the compass, the plurality of compass deviation coefficients representative of different types of noise sources; and
using the processing circuit to at least one of calibrate the compass, adjust an output from the compass, or calibrate the compass and adjust the output from the compass using the compass deviation coefficients.

12. The method of claim 11, wherein the compass deviation coefficients comprise:
a mean deviation of at least two cardinal headings;
a mean deviation of at least two intercardinal headings; and
a mean deviation relative to headings including at least one cardinal heading and at least one intercardinal heading.

13. The method of claim 12, further comprising:
using the compass deviation coefficients to affect the compass output differently when a magnetic compass heading indicates movement in a first direction relative to movement in a second direction.

14. The method of claim 12, further comprising:
updating an information structure that relates compass headings in the at least two cardinal headings and the at least two intercardinal headings to calculated deviations.

15. The method of claim 12, further comprising:
updating an information structure that relates magnetic compass headings to a plurality of calculated deviation components for each compass deviation coefficient.

16. The method of claim 15, further comprising:
looking up pre-calculated deviation components for a new magnetic compass heading when the compass is in a normal operation mode.

17. The method of claim 11, further comprising:
receiving positioning signals from a global positioning system;
using the positioning signals from the global positioning system to determine the true headings.

18. The method of claim 11, further comprising:
applying a new magnetic compass heading to the stored compass deviation coefficients to obtain a total deviation relative to the new magnetic compass heading.

19. The method of claim 11, wherein using the processing circuit to calculate a deviation for each of a plurality of headings comprises calculating deviations for all of a sequential group of headings received by the processing circuit.

20. The device of claim 11, further comprising:
determining, using the processing circuit, if the database of geographic zone error factors is stored in a local memory device; and
downloading, using the processing circuit, the database of geographic zone error factors from the internet in response to determining that the database of geographic zone error factors is not stored in the local memory device.

* * * * *